US010834897B1

(12) United States Patent
Chen

(10) Patent No.: US 10,834,897 B1
(45) Date of Patent: Nov. 17, 2020

(54) SMART PET LOCATOR

(71) Applicant: Dongguan Jiasheng Enterprise Co., Ltd, Guangdong (CN)

(72) Inventor: Silong Chen, Guangdong (CN)

( * ) Notice: Subject to any disclaimer, the term of this patent is extended or adjusted under 35 U.S.C. 154(b) by 0 days.

(21) Appl. No.: 16/667,964

(22) Filed: Oct. 30, 2019

(51) Int. Cl.
*A01K 29/00* (2006.01)
*A01K 11/00* (2006.01)
*A01K 27/00* (2006.01)

(52) U.S. Cl.
CPC .......... *A01K 11/008* (2013.01); *A01K 27/001* (2013.01); *A01K 27/006* (2013.01); *A01K 27/009* (2013.01); *A01K 29/005* (2013.01)

(58) Field of Classification Search
CPC .................................................. A01K 27/001
See application file for complete search history.

(56) References Cited

U.S. PATENT DOCUMENTS 7,803,095 B1 * 9/2010 LaGree .............. A63B 22/0089
482/121
2011/0102179 A1 * 5/2011 Ezzo ................... E05B 73/0017
340/568.1
2013/0167781 A1 * 7/2013 Marshall ............. A01K 27/004
119/794
2015/0232011 A1 * 8/2015 Kajio ..................... B60N 3/026
296/1.02

* cited by examiner

*Primary Examiner* — Emily C Terrell
*Assistant Examiner* — Pameshanand Mahase

(57) ABSTRACT

A pet locator comprises an upper shell, a lower shell and a mainframe; the upper shell is connected with the lower shell to form an installation cavity. The mainframe is installed in the installation cavity; the left and right sides of the bottom of the lower shell are symmetrically provided with a hinged seat, and the hinged seat is hanged with a wearable piece, the hinge joint of the wearable piece and the hinged seat is provided with a torsional spring, one end of the torsional spring is jammed at the hinged seat, the other end of the torsional spring is jammed at the wearable piece; when the wearable piece is rotated by manpower, the torsional spring is rolled tightly, when the wearable piece is not rotated by manpower, the torsional spring is relaxed, and the back force of the torsional spring drives the wearable piece to rotate back.

12 Claims, 6 Drawing Sheets

SMART PET LOCATOR

TECHNICAL FIELD

The invention relates to locator technical field, more particularly, to a smart pet locator.

BACKGROUND OF THE PRESENT INVENTION

Nowadays the pace of life is increasing; communication among people is decreasing day by day. While pets, such as cats and dogs, become a good living partner and are owned by an increasing number of people. To provide pets more activity space and better environment, keepers need to take pets out regularly. However when they are activity at outdoor, loss and illegal theft of the pets often occur, which brings emotional damage to breeders. As a result, a wide variety of pet locators have been developed. The existing pet locator is hung on the pet collar by a rope on it. This pet locator with a rope has the following shortcomings: when pet sports, the pet locator is thrown around on the pet collar, and the pet locator cannot stick to the pet smoothly, which is easy to collide, which damages the internal components of the pet locator and affects the performance of the pet locator.

SUMMARY OF THE PRESENT INVENTION

The object of the present invention is to provide a smart pet locator to solve the above technical shortcomings of the pet locator with rope.

In order to achieve the above object, the present invention is provided with a smart pet locator, which includes an upper shell, a lower shell and a mainframe; the upper shell is connected with the lower shell to form an installation cavity. The mainframe is installed in the installation cavity; said left and right sides of said bottom of the lower shell are symmetrically provided with a hinged seat, the hinged seat at each side is hanged with a wearable piece, hinge joint of the wearable piece and the hinged seat is provided with a torsional spring, one end of the torsional spring is jammed at the hinged seat, the other end of the torsional spring is jammed at the wearable piece. When the wearable piece is rotated by manpower, the torsional spring is rolled tightly. When the wearable piece is not rotated by manpower, the torsional spring is relaxed, and the back force of the torsional spring drives the wearable piece to rotate back.

Said left and right sides of the bottom of the lower shell, closed to the hinged seat, is depressed inwards to form a containing slot, used for placing the wearable piece, the shape of the containing slot and that of the wearable piece are matched, and the inner wall of the containing slot is provided with a clamping block outward.

The wearable piece includes a handle with two hangers, a casing pipe with two ends and two pins; the casing pipe is rotatably mounted in the hinged seat with said two ends protruding out of the hinged seat, the torsional spring is sleeved on said two ends of the casing pipe, and said two hangers of the handle are sleeved on two ends of the casing pipe; and one end of the torsional spring is clamped to the hinged seat, the other end of the torsional spring is clamped to the hanger of the handle, the two pins are inserted and fixed at both ends of the casing pipe, thereby fixing the two hangers of the handle to the casing pipe.

The head of the pin is provided with a boss, said diameter of the boss is larger than that of the pin; the tail of the pin is provided with a cap, said diameter of the cap is larger than that of the casing pipe; when the pin is inserted into the casing pipe, the boss is tightly held on the inner wall of the casing pipe, the cap is tightly held on the hanger of the handle.

The smart pet locator also includes an antenna.

The smart pet locator receives containing r 1 and R 1, r 2 and R 2, . . . , r N and R N information sent by N positioning base stations, respectively; and r 1, r 2, . . . , r N is the time when the positioning reference signal transmitted by a positioning terminal arrives at N positioning base stations, R 1, R 2, . . . , R N is the time when the positioning reference signal sent by the fixed position reference terminal reaches N positioning base stations, N≥3; the smart pet locator calculates the coordinates of the terminal to be located based on r 1, r 2. r N and R 1, R 2.

The mainframe includes a control motherboard, a rechargeable battery and a wireless charging circuit; the wireless charging circuit is electrically connected to the control motherboard and the rechargeable battery; the control motherboard, the rechargeable battery and the wireless charging circuit are mounted in the lower shell; the upper shell covers the lower shell, thereby sealing the control main board, the rechargeable battery and the wireless charging circuit.

The lower shell is provided with a central mounting position in an intermediate position and a few limiting pillars surrounded the center mounting position; the wireless charging circuit has a wireless receiving coil arranged at the bottom of the central mounting position; the rechargeable battery is arranged above the wireless receiving coil and the limiting pillars surrounds and holds the rechargeable battery; the control motherboard is arranged at the top level of the center mounting position, and the control motherboard is loaded and fixed at the top of the limiting pillar, thereby sealing the rechargeable battery and the wireless charging circuit; the wireless receiving coil is electrically connected to the control main board and the rechargeable battery, the wireless receiving coil is configured to receive an electromagnetic signal transmitted from the outside, and convert the electromagnetic signal into electric energy storage into the rechargeable battery.

The control motherboard is provided with a contact charging circuit; one side of the lower shell is provided with a charging needle mounting seat, the charging needle mounting seat is provided with a plurality of charging needle mounting holes running through the lower shell; said charging needle of the contact charging circuit is arranged in the charging needle mounting holes; the charging needle electrically connected to the control motherboard and the rechargeable battery, and the charging needle is used for charging the rechargeable battery by transmitting the electricity transmitted from the outside world.

The control motherboard is provided with a LED light source module electrically connected to the rechargeable battery, the top facing of the upper shell is depressed inwards to form a light guide slot; the light guide slot is provided with a number of light transmission holes through itself; the light guide slot is provided with a light guide strip, and the light guide strip extends into the mounting cavity through the light transmission hole and contacts the LED light source module; the rechargeable battery supplies power to the LED light source module; the light emitted by the LED light source module is evenly scattered onto the light guide strip.

The upper shell and the lower shell are connected by a buckle structure; the buckle structure includes a hook protruding downward along the inner side wall of the upper shell and a hook slot provided on the inner side wall of the lower housing; the hook is pulled into the hook slot to form a snap joint to complete the connection between the upper shell and the lower shell.

The side wall of the upper shell is protruded upward to form an upper shell bulge, and the side wall of the lower shell is recessed downward to form a lower shell concave platform matched the upper shell bulge; the lower shell concave platform is provided with an ultrasonic fusion line, when the upper shell and the lower shell are connected by a buckle structure, the upper shell bugle is attached to the ultrasonic fusion line, and the upper shell bulge and the lower shell concave platform are fixed by ultrasonic welding.

The smart pet locator in the present invention has at least one of the following advantages: When the smart pet locator is installed, the two wearable pieces hinged at the left and right hinged seat are pulled by manpower, so that the space between the wearable piece and the hinged seat is vacated for the pet collar to wear; then the pet collar is passed between the wearable piece and the hinged seat, and the position of the smart pet locator on the pet collar is adjusted. After the wearable pieces are not pulled by manpower, the back force of the torsional spring drives the wearable piece to rotate back around the hinged seat, thereby fastening the smart pet locator to the pet collar. The smart pet locator is tightly connected to the pet collar, so that it can be smoothly stick to the pet and will not be thrown around on the pet collar, which effectively reduces the collision, avoids unnecessary damage to the internal components of the smart pet locator, prolongs the service life, and better ensures the good performance of the smart pet locator. Thus, the smart pet locator in the invention can be more favored by the user and has a better market prospect.

BRIEF DESCRIPTION OF THE DRAWINGS

In order to explain more clearly the technical proposals in the present invention, the following will briefly introduce the drawings that need to be used in the embodiment or the prior art description. It is obvious that the drawings in the following description are only some embodiments of the invention, and for the ordinary technical personnel in the field, other drawings can be obtained according to these drawings without paying creative labor.

DETAILED DESCRIPTION OF THE PRESENT INVENTION

Figure 1:
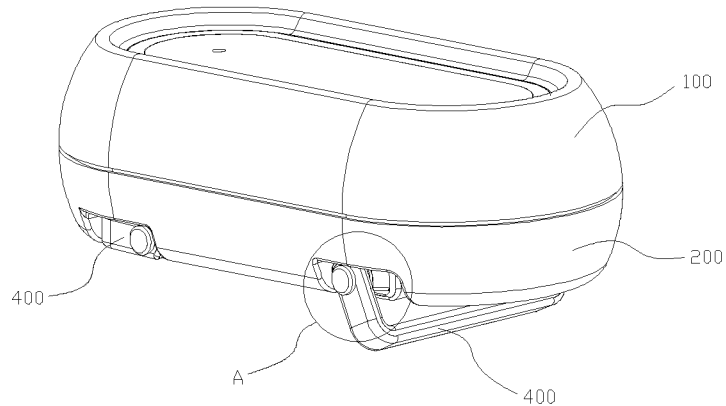
FIG. 1 is a perspective view of the smart pet locator in the present invention.
Figure 2:
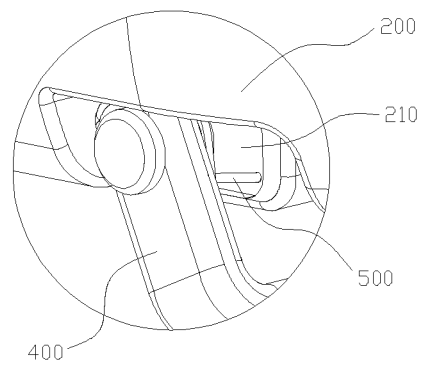
FIG. 2 is a larger version at A in FIG. 1.

Embodiments of the present invention are described in detail below, and an example of the embodiment is shown in the attached figure, in which the same or similar label represents the same or similar element or element with the same or similar function from beginning to end. The embodiments described below by reference to the attached drawings are exemplary and are intended to explain embodiments of the present invention and cannot be understood as restrictions on the present invention.

In the description of the embodiments of the present invention, it is important to understand that the azimuth or position relationships indicated by the terms "length", "width", "upper", "lower", "front", "rear", "left", "right", "vertical", "horizontal", "top", "bottom", "inside", "outside", etc., are based on the azimuth or position relationship shown in the attached figure only to facilitate the description and simplification of the embodiment of the invention. Instead of indicating or implying that the device or element must have a specific azimuth, constructed and operated in a specific azimuth, it cannot be understood as a limitation on the present invention.

In addition, the terms "the first", "the second" are for descriptive purposes only and are not to be construed as indicating or implying a relative importance or implicitly indicating the number of technical features indicated. Thus, the characteristics of "the first" and the "the second" are defined, which may include one or more of the features either explicitly or implicitly. In the description of embodiments of the invention, the "multiple" has the meaning of two or more, unless specifically defined otherwise.

In the embodiment of the invention, unless otherwise specified and limited, the terms "install", "connect", "fix" and other terms should be understood in a broad sense, for example, it can be a fixed connection, a detachable connection, or a whole, which can be a mechanical connection or an electric connection. It can be directly connected or indirectly connected by intermediate medium, which can be the internal connection of two components or the interaction between two components. For ordinary technical personnel in the field, the specific meaning of the above terms in embodiments of the present invention can be understood according to the specific circumstances.

In one embodiment of the present invention, as shown in FIGS. 1 to 7, the smart pet locator includes an upper shell 100, a lower shell 200 and a mainframe 300. The upper shell 100 is connected with the lower shell 200 to form an installation cavity. The mainframe 300 is installed in the installation cavity. said left and right sides of said bottom of the lower shell 200 are symmetrically provided with a hinged seat 210 respectively, and the hinged seat 200 on each side is hanged with a wearable piece 400, the hinge joint of the wearable piece 400 and the hinged seat 210 is provided with a torsional spring 500, one end of the torsional spring 500 is jammed at the hinged seat 210, the other end of the torsional spring 210 is jammed to the wearable piece 400. If the wearable piece 400 is rotated by manpower, the torsional spring 500 is rolled tightly. If the wearable piece 400 is not rotated by manpower, the torsional spring 210 is relaxed, and the back force of the torsional spring 210 drives the wearable piece 400 to rotate back.

The smart pet locator in the present invention is further explained as the following: The smart pet locator is stable and convenient to disassemble and assemble. Specifically, during installation, the two wearable pieces 400 hinged at the left and right hinged seat 210 are pulled by manpower to rotate around the left and right hinged seat 210, so that the space between the wearable piece 400 and the hinged seat 210 is vacated for the pet collar to wear. At this time, the torsional spring 500 is rolled tightly. Then the pet collar is passed between the wearable piece 400 and the hinged seat 210 in turn, and the position of the smart pet locator on the pet collar is adjusted. After the wearable piece 400 is not pulled by manpower, the torsional spring 500 is relaxed, the back force of the torsional spring 500 drives the wearable piece 400 to rotate back around the hinged seat 210, and the two wearable pieces 400 press the pet collar on the hinged seats 210, thereby fastening the smart pet locator to the pet collar, and finally fixing the pet collar on a pet. When the smart pet locator is needed to be disassemble and maintenance, the pet collar is taken off from the pet, the wearable pieces 400 are pulled by manpower to rotate around the left and right hinged seat 210, so that the space between the wearable piece 400 and the hinged seat 210 is vacated for taking off the pet collars, then the pet collar is pulled out, and the smart pet locator can be removed separately.

And, if the pet wears the smart pet locators in the present invention, when the pet moves, since the torsional springs 500 drive the left and right wearable pieces 400 to press the pet collar on the hinged seat 210, the smart pet locator is tightly connected to the pet collar, so that the smart pet locator can be smoothly stick to the pet and will not be thrown around on the pet collar, which effectively reduces the collision, avoids unnecessary damage to the internal components of the smart pet locator, prolongs the service life, and better ensures the good performance of the smart pet locator. Thus, the smart pet locator in the invention can be more favored by the user and has a better market prospect.

Figure 3:
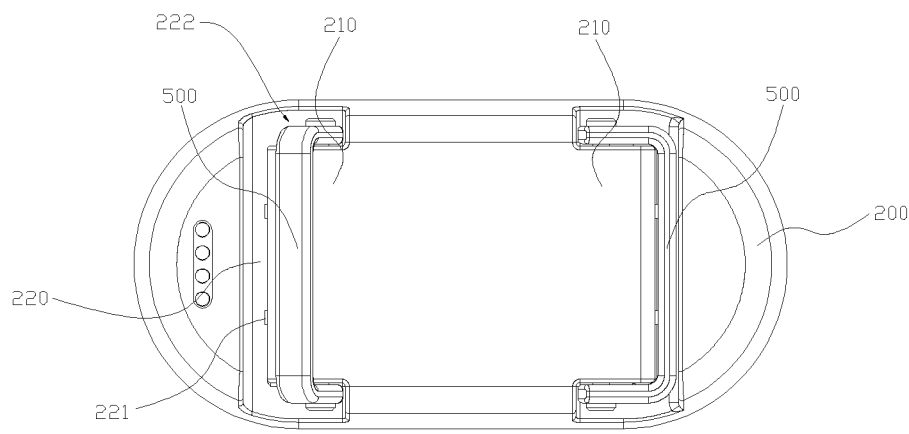
FIG. 3 is an elevation view of the smart pet locator in the present invention.
Figure 4:
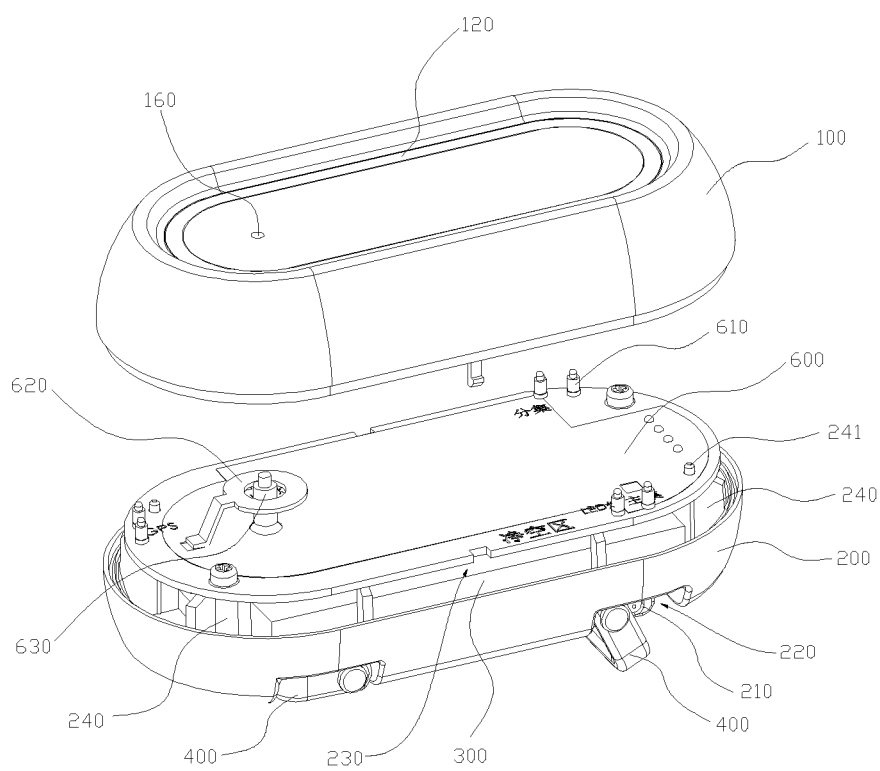
FIG. 4 is an explode view of the smart pet locator in the present invention.

In another embodiment of the present invention, as shown in FIG. 3, said left and right sides of the bottom of the lower shell 200, closed to the hinged seat 210, respectively depressed inwards to form a containing slot 220, used for placing the wearable piece 400, the shape of the containing slot 220 and that of the wearable piece 400 are matched, and the inner wall of the containing slot 220 is provided with a clamping block outward. Specifically, when the smart pet locator is disassembled and maintained, the spring back force of the torsional spring 500 drives the wearable piece 400 to rotate around the hinged seat 210, the wearable piece 400 is partly embedded in the containing slot 220. The wearable piece 400 is fully embedded in the containing slot 220 by pressing the wearable piece 400, then the clamping block 221 on the inner wall of the containing slot 220 tightly holds the wearable piece 400. Therefore, the wearable piece 400 can be stably placed in the containing slot 220 when the smart pet locator is not in use, the upper shell 100, the lower shell 200 and the wearable piece 400 form a whole with a ingenuous structure, which does not occupy space and is convenient for daily storage and transportation.

Preferably, the left and right ends of the containing slot 220 has a take-off position 222 running through the side wall of the lower shell 200. User can take out and install the wearable piece 400 embedded in the containing slot 220 with his hand or other tools reaching into the containing slot 220. The structure design is reasonable, the operation is easy and the practicability is strong.

Figure 7:
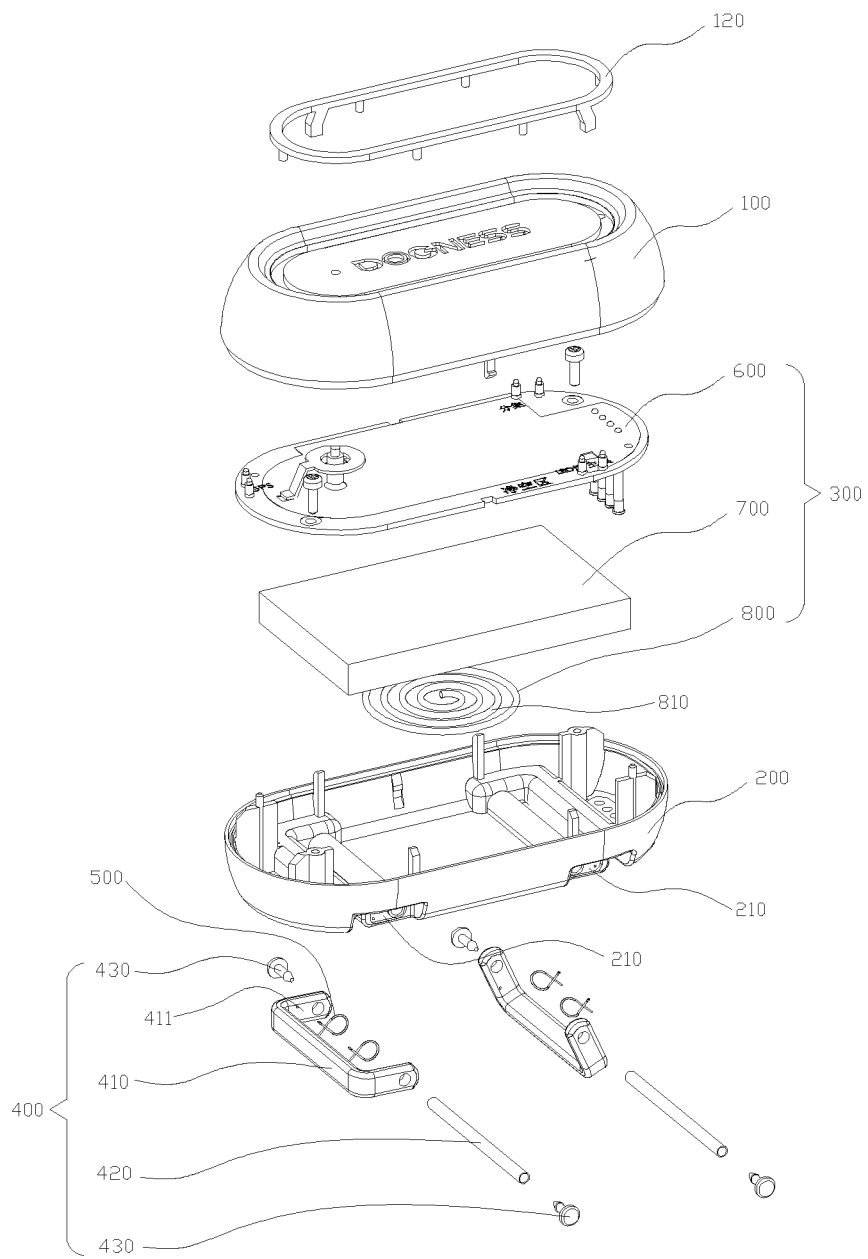
FIG. 7 is the second explode view of the smart pet locator in the present invention.

In another embodiment of the present invention, as shown in FIG. 1 and FIG. 7, the wearable piece 400 includes a handle 410 with two hangers 411, a casing pipe 420 with two ends and two pins 430. The casing pipe 420 is rotatably mounted in the hinged seat 210 with said two ends protruding out of the hinged seat 210, the torsional spring 500 is sleeved on said two ends of the casing pipe 420, and said two hangers 411 of the handle 410 are sleeved on two ends of the casing pipe 420. And one end of the torsional spring 500 is clamped to the hinged seat 210, and the other end of the torsional spring 500 is clamped to the hanger 411 of the handle 410, the two pins 430 are inserted and fixed at both ends of the casing pipe 420, thereby fixing the two hangers 411 of the handle 410 to the casing pipe 420. Specifically, the installation process of the wearable piece 400 is simple and fast. First, rotatably mount the casing pipe 420 in the hinged seat 210 and ensures said two ends protrude out of the hinged seat 210, then respectively sleeve the two torsional springs 500 on said two ends of the casing pipe 420 and ensures one end of the torsional springs 500 jam on the hinged seat 210, then sleeve the two hangers 411 of the handle 410 on said both ends of the casing pipe 420 and ensures the other end of the torsional springs 500 jam on the hanger 411. Finally, insert and fix the two pins 430 at said ends of the casing pipe 420 respectively. The installation process of wearable piece 400 is completed.

Figure 12:
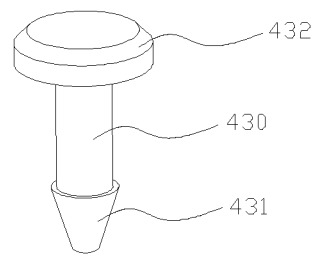
FIG. 12 is a perspective view of the pin in the present invention.

In another embodiment of the present invention, as shown in FIG. 12, the head of the pin 430 is provided with a boss 431, the tail of the pin 430 is provided with a cap 432. The diameter of the boss 431 is larger than that of the pin 430, when the pin 430 is inserted at the end of the casing pipe 420, the boss 431 is tightly held on the inner wall of the casing pipe 420, which ensures a close combination between the pin 430 and the casing pipe 420. And the diameter of the cap 432 is larger than that of the casing pipe 420, when the pin 430 is fixed at the end of the casing pipe 420, the cap 432 is tightly held on the hanger 411 of the handle 410, thereby fixing the hanger 411 with the casing pipe 420, effectively avoiding the hanger 411 from falling off the casing pipe 420. The connection is more stably.

In another embodiment in the present invention, the smart pet locator also includes an antenna. Then antenna is a GPS metal antenna for receiving satellite signals installed on the control motherboard 600. The GPS metal antenna can effectively monitor the real-time position of pets, prevent loss and theft, locate and track. In addition, the structure, circuit and implementation of the antenna are conventional technology that technicians in the field should know.

In another embodiment in the present invention, the smart pet locator receives containing r 1 and R 1, r 2 and R 2, . . . , r N and R N information sent by N positioning base stations, respectively; and r 1, r 2, . . . , r N is the time when the positioning reference signal transmitted by a positioning terminal arrives at N positioning base stations, R 1, R 2, . . . , R N is the time when the positioning reference signal sent by the fixed position reference terminal reaches N positioning base stations, N≥3; the smart pet locator calculates the coordinates of the terminal to be located based on r 1, r 2. r N and R 1, R 2.

Figure 5:
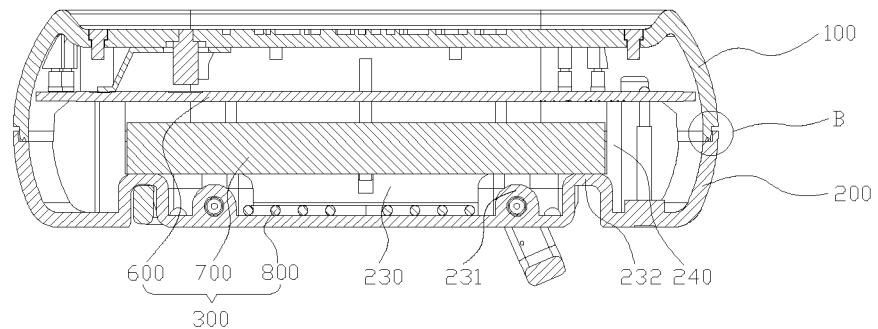
FIG. 5 is a section view of the smart pet locator in the present invention.

In another embodiment of the present invention, as shown in FIG. 5 and FIG. 7, the mainframe 300 includes a control motherboard 600, a rechargeable battery 700 and a wireless charging circuit 800. The wireless charging circuit 800 is electrically connected to the control motherboard 600 and the rechargeable battery 700. The control motherboard 600, the rechargeable battery 700 and the wireless charging circuit 800 are mounted in the lower shell 200. The upper shell 100 covers the lower shell 200, thereby sealing the control main board 600, the rechargeable battery 700 and the wireless charging circuit 800.

Figure 10:
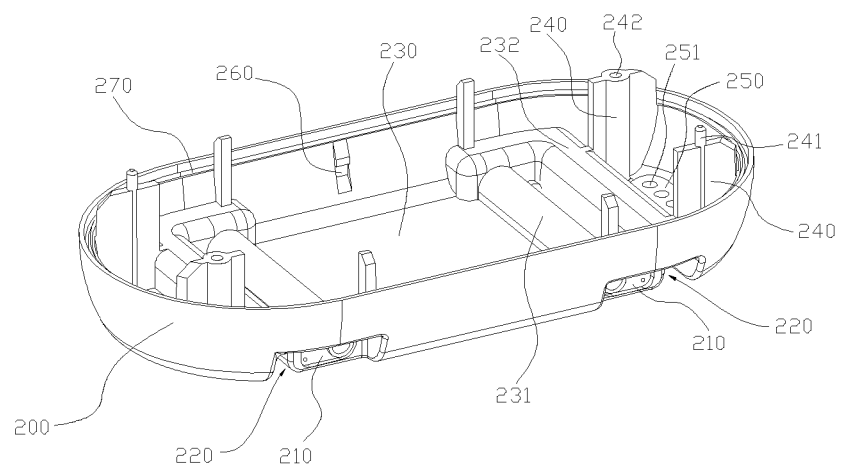
FIG. 10 is a perspective view of the lower shell in the present invention.

Further, as shown in FIG. 10, the lower shell 200 is provided with a central mounting position 230 in an intermediate position and a few limiting pillars 240 surrounded the center mounting position 230. The wireless charging circuit 800 has a wireless receiving coil 811 arranged at the bottom of the central mounting position 230. The left and right sides of the bottom of the center mounting position 230 upward protrude to form a coil limit 231 respectively. The wireless receiving coil 811 is pasted in the space enclosed by the bottom of the center mounting position 230 and the left and right coil limiting part 231. The rechargeable battery 700 is arranged above the wireless receiving coil 810 and is in the middle layer of the central mounting position 230. The left and right sides of the middle layer of the central installation position 230 protrude upward to form a battery lap part 232 respectively, and the height of the battery lap part 232 is higher than that of the coil limit part 231. The rechargeable battery 700 is mounted on the battery lap part 232 on the left and right sides, while the limiting pillars 240 surround and hold the rechargeable battery 700. The control motherboard 600 is arranged at the top level of the center mounting position 230, two adjacent limiting pillars 240 are provided with motherboard limiting pin 241 and motherboard fixing hole 242, respectively. The control motherboard 600 is loaded at the top of the limit limiting pillars 240. On the one hand, the motherboard limiting pin 241 is plugged into the control motherboard 600 to prevent it from moving, on the other hand, the control motherboard 600 is fixed at the top of the limiting pillar 240 through a number of fastening screws in conjunction with the motherboard fixing hole 242, thereby sealing the rechargeable battery 700 and the wireless charging circuit 800. Therefore, the control motherboard 600, the rechargeable battery 700 and the wireless charging circuit 800 can be stably fixed in the lower shell 200. Even in the course of pet movement, they are no shake, which avoids the safety hazard due to the improper connection between the internal components and the shell.

Further, the wireless receiving coil 810 is electrically connected to the control main board 600 and the rechargeable battery 700, the wireless receiving coil 810 is configured to receive an electromagnetic signal transmitted from the outside, and convert the electromagnetic signal into electric energy storage into the rechargeable battery 700.

Figure 11:
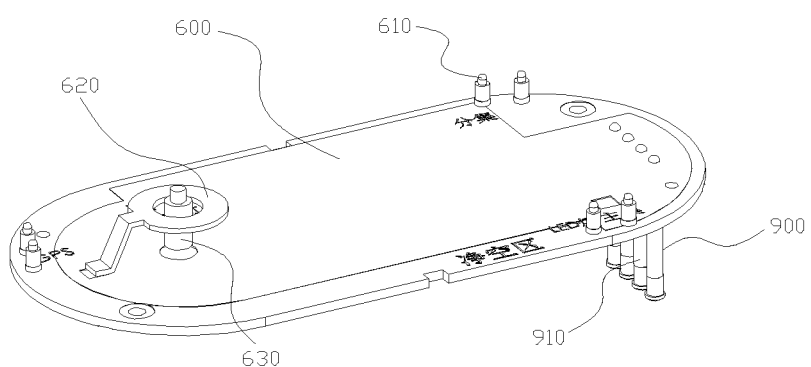
FIG. 11 is a perspective view of the mainframe in the present invention.

In addition, in order to improve the reliability of the invention, the invention provides more than one charging mode in addition to the wireless charging mode. In another embodiment of the present invention, as shown in FIGS. 10 and 11, the control motherboard 600 is provided with a contact charging circuit 900. One side of the lower shell 200 is provided with a charging needle mounting seat 250, the charging needle mounting seat 250 is provided with a plurality of charging needle mounting holes 251 running through the lower shell 200. said charging needle 910 of the contact charging circuit 900 is arranged in the charging needle mounting holes 251. The charging needle 910 electrically connected to the control motherboard 600 and the rechargeable battery 700, and the charging needle 910 is used for charging the rechargeable battery 700 by transmitting the electricity transmitted from the outside world.

In another embodiment of the present invention, the control motherboard 600 is provided with a blue-tooth module, a motion monitoring module and a vital sign monitoring module. The Bluetooth module is a PCBA board which integrates Bluetooth function and is used for short distance wireless communication. According to function, the Bluetooth module is divided into Bluetooth data module and Bluetooth voice module. The blue-tooth data module refers to the integrated Bluetooth function of the chip basic circuit set, which is used for wireless network communication, can be roughly divided into data transmission module and remote control module. Generally, the module has semifinished product attributes, is processing on the basis of the chip to make the subsequent application more simple. The motion monitoring module is used for converting the change of the non-electric quantity (such as speed and pressure) into a motion sensor with a change of electric quantity, and can be divided into a pressure sensor, a speed sensor, a temperature sensor and the like according to the converted non-electric quantity. The motion monitoring module is also parts and accessories for measuring and controlling instruments and equipment. The vital sign monitoring module is a remote monitor of vital signs, which can remotely monitor the physical signs of pets through three physical signs sensors: body temperature sensor, respiratory sensor and pulse sensor. Because of the Bluetooth module, the motion monitoring module and the vital signs monitoring module are existing technologies in the technical field of the pet locator, and their specific structure and other descriptions are not repeated in this application.

Figure 8:
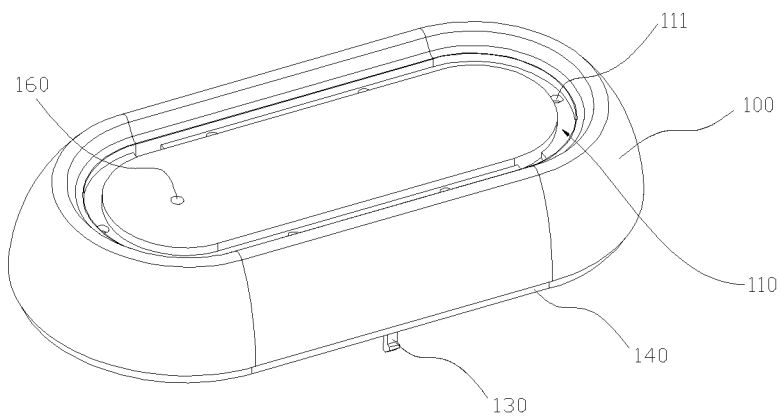
FIG. 8 is a perspective view of the upper shell in the present invention.

Further, as shown in FIG. 8 and FIG. 11, the control motherboard 600 is provided with a LED light source module 610 electrically connected to the rechargeable battery 700, the top facing of the upper shell 100 is depressed inwards to form a light guide slot 110. The light guide slot 110 is provided with a number of light transmission holes 111 through itself. The light guide slot 110 is provided with a light guide strip 120, and the light guide strip 120 extends into the mounting cavity through the light transmission hole 111 and contacts the LED light source module 610. When in use, the rechargeable battery 700 supplies power to the LED light source module 610, the light emitted by the LED light source module 610 is evenly scattered onto the light guide strip 120, so that the light guide bar 120 presents the color of the LED light source module 610, which is more eye-catching at night and can emit eye-catching light when people tracts pets at night to prevent pet loss.

Figure 9:
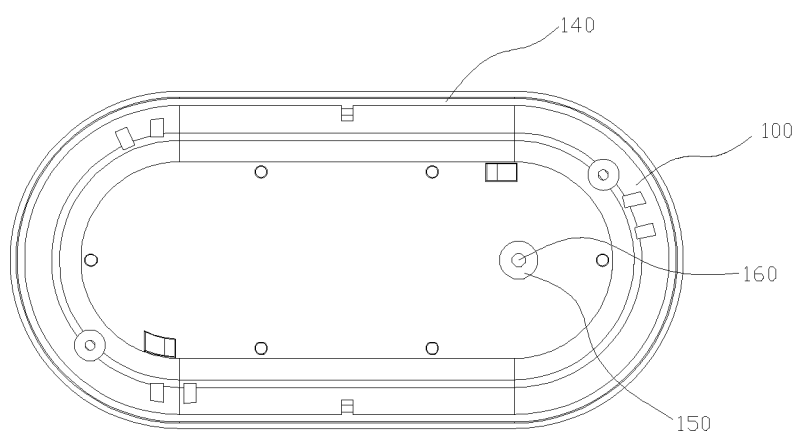
FIG. 9 is a elevation view of the upper shell in the present invention.

Further, as shown in FIG. 9 and FIG. 11, the control motherboard 600 is connected with a FPC touch button 620. The inner wall of the upper shell 100 is provided with a keystroke mounting position 150 for installing the FPC touch keystroke 620. The top of the FPC touch button 620 is fixed on the keystroke mounting position 150. The bottom of the FPC touch button 620 is electrically connected to the control motherboard 600. The control motherboard 600 is triggered to switch on/off or other modes of the smart pet locator by touching the FPC touch button 620. the operation is convenient and the user experience of the product is improved.

As shown in FIG. 8 and FIG. 11, the control motherboard 600 is also equipped with an indicator light, the indicator light is fixed with a light guide pillar 630, the upper shell 100 is provided with a signal prompt position 160 running through itself and using for installing the light guide pillar 630, the top of the light guide pillar 630 is inserted on the signal prompt position 160, and the bottom of the light guide pillar 630 is arranged on the indicator light. The light emitted by the indicator light is evenly scattered to the light guide pillar 630 and displayed on the signal prompt position 160. When the smart pet locator is operated, the indicator light will flash on the signal prompt position 160 through the light guide post 630.

In another embodiment of the present invention, as shown in FIG. 8 and FIG. 10, the upper shell 100 and the lower shell 200 are connected by a buckle structure. The buckle structure includes a hook 130 protruding downward along the inner side wall of the upper shell 100 and a hook slot 260 provided on the inner side wall of the lower shell 200. The hook 130 is pulled into the hook slot 260 to form a snap joint between the upper shell 100 and the lower shell 200. Specifically, the snap joint prevented the upper shell 100 and the lower shell 200 from being separated by vibration or unintentional pulling, so as to ensure the safety of the use of the smart pet locator. In addition, with the buckle structure the assembly of the upper shell 100 and the lower shell 200 is simple, and the phenomenon of easy fracture and loosening does not occur.

Figure 6:
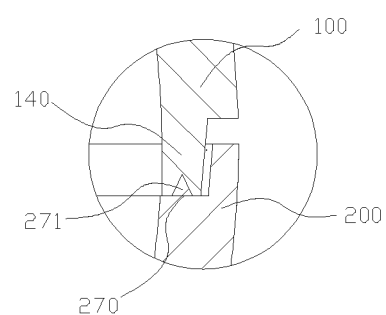
FIG. 6 is a larger version at B in FIG. 5.

In order to make the connection between the upper shell 100 and the lower shell 200 stronger, in another embodiment of the present invention, as shown in FIG. 6, the side wall of the upper shell 100 is protruded upward to form an upper shell bulge 140, and the side wall of the lower shell 200 is recessed downward to form a lower shell concave platform 270 matched the upper shell bulge 140. The lower shell concave platform 270 is provided with an ultrasonic fusion line 271. After the upper shell 100 and the lower shell 200 are connected by a buckle structure, the upper shell bugle 140 is attached to the ultrasonic fusion line 271, and the upper shell bulge 140 and the lower shell concave platform 270 are fixed by ultrasonic welding. Specifically, the upper shell bulge 140 of the upper shell 100 is combined with the lower shell concave platform 270 of the lower shell 200 to form an integrated structure by ultrasonic welding, so that the joint between the upper shell 100 and the lower shell 200 is more stable. At the same time, the upper shell 100 and the lower shell 200 are fixed by ultrasonic welding, which effectively prevents liquid, dust and other impurities from entering the smart pet locator from the joint between the upper shell 100 and the lower shell 200, thus improving the sealing effect and waterproof effect of the smart pet locator, so that the smart pet locator can be used in different outdoor environments and has a wide range of use.

The above is only a better embodiment of the present invention and is not used to limit the invention. Any changes made in the spirit and principles of the invention, equivalent to substitution and improvement, etc., shall be included in the scope of protection of the invention.

What is claimed is:

1. A smart pet locator, wherein comprising an upper shell, a lower shell and a mainframe; said upper shell is connected with said lower shell to form an installation cavity; said mainframe is installed in said installation cavity; said left and right sides of said bottom of said lower shell are symmetrically provided with a hinged seat respectively, and said hinged seat is hanged with a wearable piece, hinge joint of said wearable piece and said hinged seat is provided with a torsional spring with one end and the other end, one end of said torsional spring is jammed at said hinged seat, the other end of said torsional spring is jammed at said wearable piece; when said wearable piece is rotated by manpower, said torsional spring is rolled tightly; when said wearable piece is not rotated by manpower, said torsional spring is relaxed, and said back force of said torsional spring drives said wearable piece to rotate back.

2. The smart pet locator according to claim 1, wherein said left and right sides of said bottom of said lower shell is respectively depressed inwards to form a containing slot, used for placing said wearable piece, its shape of said containing slot and that of said wearable piece are matched, and its inner wall of said containing slot is provided with a clamping block outward.

3. The smart pet locator according to claim 1, wherein said wearable piece includes a handle with two hangers, a casing pipe with two ends and two pins; said casing pipe is rotatably mounted in said hinged seat with its two ends protruding out of said hinged seat, said torsional spring is sleeved on its two ends of said casing pipe, and said two hangers of said handle are sleeved on its two ends of said casing pipe; and one end of said torsional spring is clamped to said hinged seat, the other end of said torsional spring is clamped to said hanger of said handle, said two pins are inserted and fixed at its two ends of said casing pipe, thereby fixing said two hangers of said handle to said casing pipe.

4. The smart pet locator according to claim 3, wherein tits head of said pin is provided with a boss, its diameter of said boss is larger than that of said pin; its tail of said pin is provided with a cap, its diameter of said cap is larger than that of said casing pipe; when said pin is inserted into said casing pipe, said boss is tightly held on its inner wall of said casing pipe, said cap is tightly held on said hanger of said handle.

5. The smart pet locator according to claim 1, wherein said smart pet locator also includes an antenna.

6. The smart pet locator according to claim 1, wherein said smart pet locator receives containing r(1) and R(1), r (2) and R (2), . . . r(N) and R(N) information sent by N positioning base stations, respectively; and r(1), r(2), . . . , r(N) is time when a positioning reference signal transmitted by a positioning terminal arrives at said N positioning base stations, R (1), R (2), . . . , R(N) is time when the positioning reference signal sent by fixed position reference terminal reaches said N positioning base stations, N≥3; said smart pet locator calculates the coordinates of the terminal to be located based on r(1), r (2), r (N) and R (1), R (2).

7. The smart pet locator according to claim 1, wherein said mainframe includes a control motherboard, a rechargeable battery and a wireless charging circuit; said wireless charging circuit is electrically connected to said control motherboard and said rechargeable battery; said control motherboard, said rechargeable battery and said wireless charging circuit are mounted in said lower shell; said upper shell covers said lower shell, thereby sealing said control main board, said rechargeable battery and said wireless charging circuit.

8. The smart pet locator according to claim 7, wherein said lower shell is provided with a central mounting position in an intermediate position and a few limiting pillars surrounded said center mounting position; said wireless charging circuit has a wireless receiving coil arranged at its bottom of said central mounting position; said rechargeable battery is arranged above said wireless receiving coil and said limiting pillars surrounds and holds said rechargeable battery; said control motherboard is arranged at its top level of said center mounting position, and said control motherboard is loaded and fixed at its top of said limiting pillar, thereby sealing said rechargeable battery and said wireless charging circuit; said wireless receiving coil is electrically connected to said control main board and said rechargeable battery, said wireless receiving coil is configured to receive an electromagnetic signal transmitted from outside, and convert said electromagnetic signal into electric energy storage into said rechargeable battery.

9. The smart pet locator according to claim 7, wherein said control motherboard is provided with a contact charging circuit; one side of said lower shell is provided with a charging needle mounting seat, said charging needle mounting seat is provided with a plurality of charging needle mounting holes running through said lower shell; said charging needle of said contact charging circuit is arranged in said charging needle mounting holes; said charging needle electrically connected to said control motherboard and said rechargeable battery, and said charging needle is used for charging said rechargeable battery by transmitting said electricity transmitted from said outside.

10. The smart pet locator according to claim 7, wherein said control motherboard is provided with a LED light source module electrically connected to said rechargeable battery, its top facing of said upper shell is depressed inwards to form a light guide slot; said light guide slot is provided with a number of light transmission holes through itself; said light guide slot is provided with a light guide strip, and said light guide strip extends into said mounting cavity through said light transmission hole and contacts said LED light source module; said rechargeable battery supplies power to said LED light source module; said light emitted by said LED light source module is evenly scattered onto said light guide strip.

11. The smart pet locator according to claim 1, wherein said upper shell and said lower shell are connected by a buckle structure; said buckle structure includes a hook protruding downward along its inner side wall of said upper shell and a hook slot provided on its inner side wall of said lower shell; said hook is pulled into said hook slot to form a snap joint between said upper shell and said lower shell.

12. The smart pet locator according to claim 11, wherein its side wall of said upper shell is protruded upward to form an upper shell bulge, and its side wall of said lower shell is recessed downward to form a lower shell concave platform matched said upper shell bulge; said lower shell concave platform is provided with an ultrasonic fusion line, after said upper shell and said lower shell are connected by a buckle structure, said upper shell bugle is attached to said ultrasonic fusion line, and said upper shell bulge and said lower shell concave platform are fixed by ultrasonic welding.

* * * * *